(12) United States Patent
Lyu

(10) Patent No.: US 7,339,634 B2
(45) Date of Patent: *Mar. 4, 2008

(54) THIN FILM TRANSISTOR ARRAY PANEL WITH VARYING COUPLING CAPACITANCE BETWEEN THE FIRST AND SECOND PIXEL ELECTRODE

(75) Inventor: Jae-Jin Lyu, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/505,754

(22) Filed: Aug. 17, 2006

(65) Prior Publication Data

US 2006/0274219 A1 Dec. 7, 2006

Related U.S. Application Data

(63) Continuation of application No. 10/909,379, filed on Aug. 3, 2004, now Pat. No. 7,113,233.

(30) Foreign Application Priority Data

Aug. 4, 2003 (KR) ............................ 2003-0053737

(51) Int. Cl.
*G02F 1/1343* (2006.01)
(52) U.S. Cl. ...................... 349/38; 349/143; 349/106; 349/144

(58) Field of Classification Search ................... None
See application file for complete search history.

(56) References Cited

U.S. PATENT DOCUMENTS

2003/0107696 A1* 6/2003 Song .......................... 349/141

* cited by examiner

*Primary Examiner*—David Nelms
*Assistant Examiner*—Lucy Chien
(74) *Attorney, Agent, or Firm*—Cantor Colburn LLP

(57) ABSTRACT

A thin film transistor array panel comprising an insulating substrate; a plurality of first signal lines formed on the insulating substrate; a plurality of second signal lines intersecting the first signal lines in an insulated manner to define pixel areas; a plurality of first pixel electrodes formed in each of the pixel areas; a plurality of thin film transistors having three electrodes respectively connected to the first signal line, the second signal line, and the first pixel electrode; and a plurality of second pixel electrodes formed in each of the pixel areas and electrically coupled with the first pixel electrodes, wherein the pixels include red, green, and blue pixels, and coupling capacitances between the first pixel electrodes and the second pixel electrodes are different among the red, green, and blue pixels. An LCD using such a thin film transistor array panel shows improved side visibility and has a wide viewing angle.

15 Claims, 11 Drawing Sheets

THIN FILM TRANSISTOR ARRAY PANEL WITH VARYING COUPLING CAPACITANCE BETWEEN THE FIRST AND SECOND PIXEL ELECTRODE

CROSS REFERENCE TO RELATED APPLICATIONS

This application is a continuation application of U.S. application Ser. No. 10/909,379 filed Aug. 3, 2004, now U.S. Pat. No. 7,113,233 which claims priority to and the benefit of Korean Patent Application No. 10-2003-0053737 filed on Aug. 4, 2003, both of which are incorporated by reference herein in their entirety.

BACKGROUND OF THE INVENTION

1. Field of the Invention

The present invention relates to a liquid crystal display and a thin film transistor array panel.

2. Description of the Related Art

A liquid crystal display (LCD) is one of the most widely used flat panel displays. An LCD includes two panels provided with field-generating electrodes, and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

The LCD has a disadvantage of a narrow viewing angle. Various techniques for enlarging the viewing angle have been suggested, and a technique utilizing a vertically aligned LC and providing cutouts or protrusions at field-generating electrodes such as pixel electrodes and a common electrode is promising.

To describe the method of providing cutouts in more detail, pixel electrodes and a common electrode respectively have cutouts, the cutouts induce a slanted electric field, and the slanted electric field controls falling directions of liquid crystals. Control of the falling direction of liquid crystals makes it possible to widen the viewing angle of liquid crystal display. To describe the method of providing protrusions in more detail, protrusions are formed on both of pixel electrodes and a common electrode, the protrusions induce a slanted electric field, and the slanted electric field controls falling directions of liquid crystals.

Other methods in which pixel electrodes have cutouts and protrusions formed on a common electrode is also possible to control falling directions of liquid crystals. An LCD using cutouts or protrusions has an excellent viewing angle of over 80 degrees in any direction, in view of the contrast ratio where 1:10 is a standard contrast ratio and in view of gray scale inversion where a viewing angle of occurring brightness inversion is a standard angle. However, such an LCD shows poor visibility that is even inferior to a twisted nematic mode LCD. The poor visibility is caused by discordance of the gamma curve between the front view and side view. For example, in a vertically aligned mode LCD using cutouts, as the viewing angle is increased, the picture plane becomes brighter and the color shifts toward white. When this phenomenon is excessive, the image is distorted because the brightness difference between gray scales disappears. As the use of the LCD is widened to include multimedia displays, the visibility becomes more important.

SUMMARY OF THE INVENTION

An object of the present invention is to provide an LCD having improved visibility. To achieve such an object, a pixel area includes two pixel electrodes, different voltages are applied to the two pixel electrodes, and a voltage difference between the two pixel electrodes is different among red, green, and blue pixels.

Concretely, a thin film transistor array panel comprises: an insulating substrate; a plurality of first signal lines formed on the insulating substrate; a plurality of second signal lines intersecting the first signal lines in an insulated manner to define pixel areas; a plurality of first pixel electrodes formed in each of the pixel areas; a plurality of thin film transistors having three electrodes respectively connected to the first signal line, the second signal line, and the first pixel electrode; and a plurality of second pixel electrodes formed in each of the pixel areas and electrically coupled with the first pixel electrodes, wherein the pixels include red, green, and blue pixels and coupling capacitances between the first pixel electrode and the second pixel electrode are different among the red, green, and blue pixels.

The thin film transistor array panel may further comprise a plurality of coupling electrodes connected to the first pixel electrode and overlapped with the second pixel electrodes in an insulated manner. At least one of the first and second pixel electrodes may have a domain dividing member. The coupling electrodes may be connected to and elongated from drain electrodes of the thin film transistors. The length of the coupling electrodes may decrease in an order of green, red, and blue pixels, and the width of the coupling electrodes may decrease in an order of green, red, and blue pixels. When the coupling capacitance between the first pixel electrode and the second pixel electrode in a green pixel is 1, the coupling capacitance of the first pixel electrode and the second pixel electrode in a red pixel preferably ranges from 0.95 to 1.0 and that of a blue pixel preferably ranges from 0.75 to 0.95.

A thin film transistor array panel comprises: an insulating substrate; a plurality of first signal lines formed on the insulating substrate; a plurality of second signal lines intersecting the first signal lines in an insulated manner to define pixel areas; a plurality of first pixel electrodes formed in each of the pixel areas; a plurality of thin film transistors having three electrodes respectively connected to the first signal line, the second signal line, and the first pixel electrode; and a plurality of second pixel electrodes formed in each of the pixel areas and electrically coupled with the first pixel electrodes, wherein the pixels include red, green, and blue pixels and area ratios of the second pixel electrode with respect to the first pixel electrode are different among the red, green, and blue pixels.

The thin film transistor array panel may further comprise a plurality of coupling electrodes connected to the first pixel electrode and overlapped with the second pixel electrodes in an insulated manner. The coupling electrodes may be connected to and elongated from drain electrodes of the thin film transistors. At least one of the first and second pixel electrodes may have a domain dividing member. The area ratios of the second pixel electrode with respect to the first pixel electrode may increase in an order of green, red, and blue pixels. The area ratios of the second pixel electrode with respect to the first pixel electrode in green, red, and blue pixels may be respectively 6:4, 5.5:4.4, and 5:5.

BRIEF DESCRIPTION OF THE DRAWINGS

The above and other advantages of the present invention will become more apparent by describing preferred embodiments thereof in detail with reference to the accompanying drawings, in which.

DETAILED DESCRIPTION OF THE PREFERRED EMBODIMENTS

Figure 1:
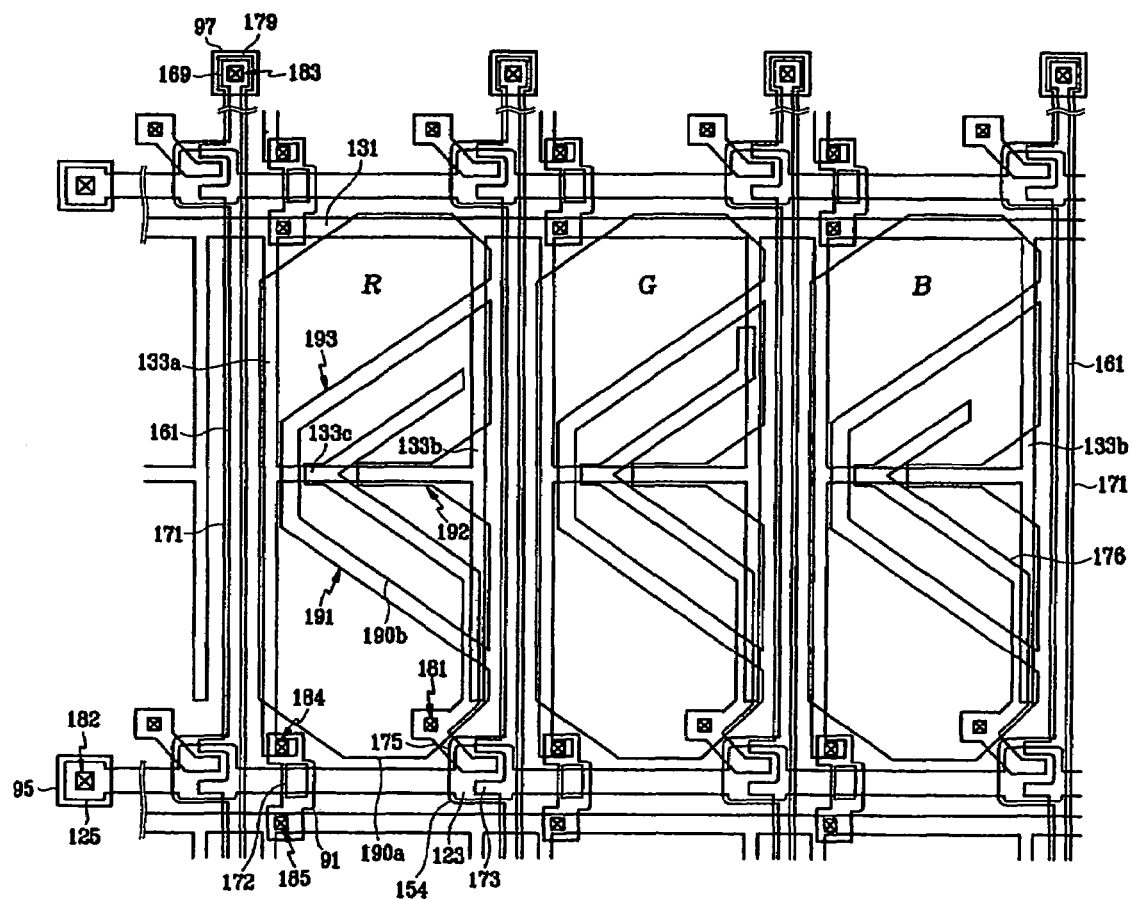
FIG. 1 is a layout view of a thin film transistor array panel for an LCD according to an embodiment of the present invention.

The present invention now will be described more fully hereinafter with reference to the accompanying drawings, in which preferred embodiments of the invention are shown. The present invention may, however, be embodied in many different forms and should not be construed as being limited to the embodiments set forth herein.

In the drawings, the thickness of layers, films, and regions are exaggerated for clarity. Like numerals refer to like elements throughout. It is to be understood that when an element such as a layer, film, region, or substrate is referred to as being "on" another element, it can be directly on the other element or intervening elements may also be present. In contrast, when an element is referred to as being "directly on" another element, there are no intervening elements present.

Now, liquid crystal displays and thin film transistor (TFT) array panels for LCDs according to embodiments of the present invention will be described with reference to the accompanying drawings.

Figure 2:
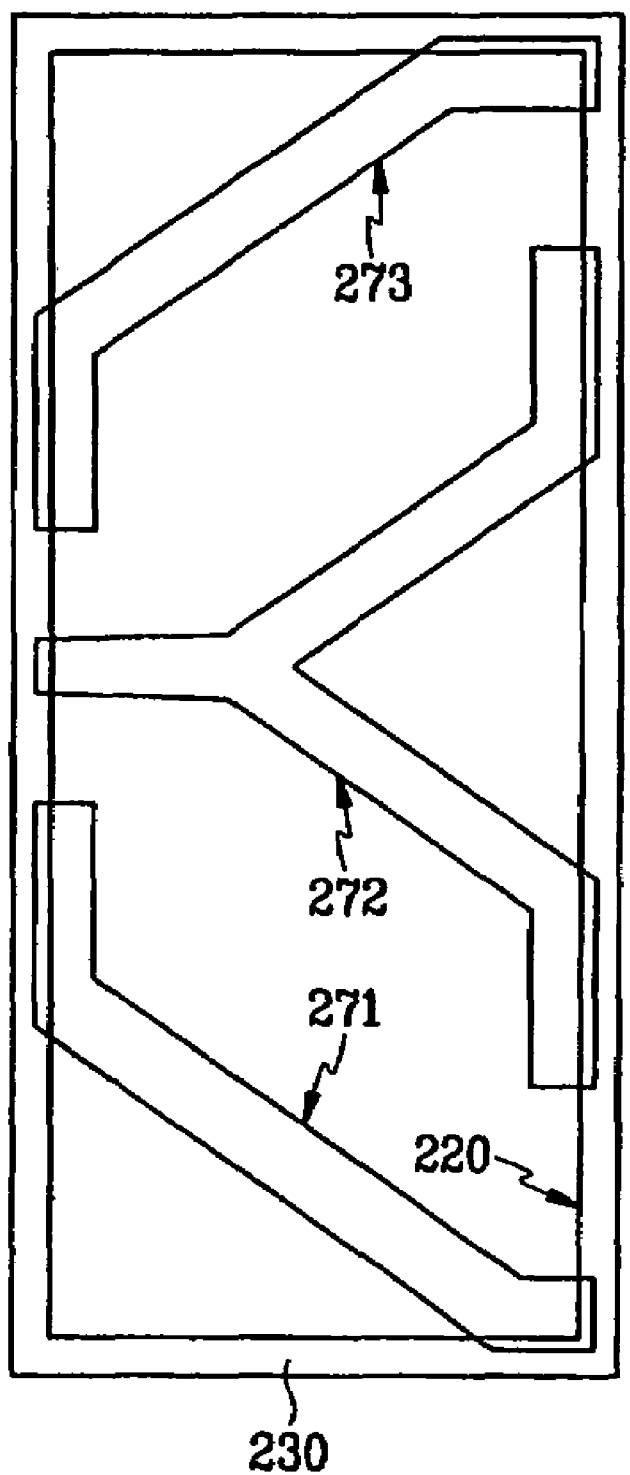
FIG. 2 is a layout view of a color filter panel for an LCD according to an embodiment of the present invention.
Figure 3:
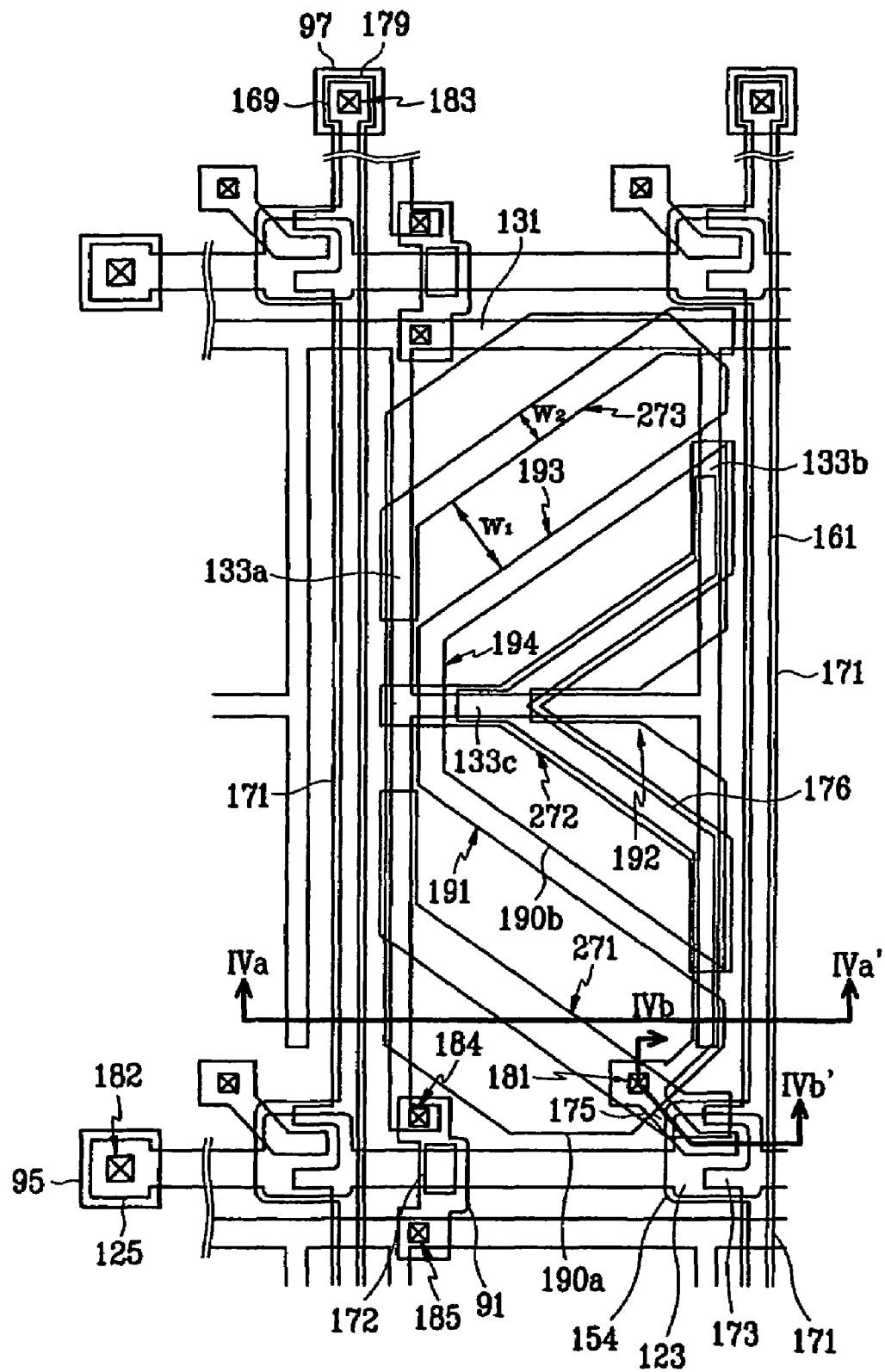
FIG. 3 is a layout view of an LCD according to the embodiment shown in FIGS. 1 and 2.
Figure 4A:
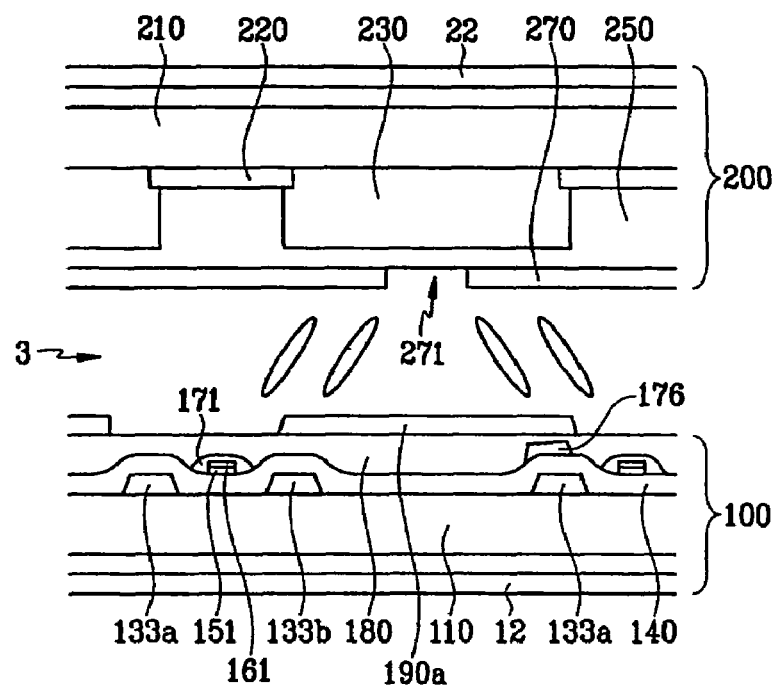
FIG. 4A and FIG. 4B is a sectional view of the LCD shown in FIG. 3 taken along the line IV-IV'.
Figure 4B:
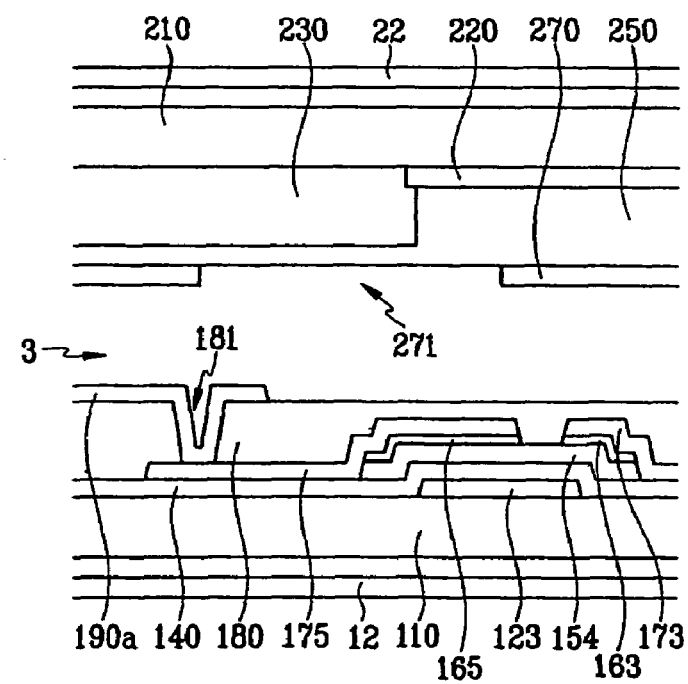

FIG. 1 is a layout view of a thin film transistor array panel for an LCD according to an embodiment of the present invention; FIG. 2 is a layout view of a color filter panel for an LCD according to an embodiment of the present invention; FIG. 3 is a layout view of an LCD according to the embodiment shown in FIGS. 1 and 2; and FIG. 4 is a sectional view of the LCD shown in FIG. 3 taken along the line IV-IV'.

An LCD according to an embodiment of the present invention includes a TFT array panel 100, a common electrode panel 200, and a LC layer 3 interposed between the panels 100 and 200 and containing a plurality of LC molecules aligned vertically to surfaces of the panels 100 and 200.

A structure of the TFT array panel 100 will now be described. A plurality of first and second pixel electrodes 190a and 190b made of indium tin oxide (ITO) or indium zinc oxide (IZO) are formed on an insulating substrate 110 made of a transparent material such as glass. The first pixel electrode 190a is connected to a thin film transistor and receives image data voltages. The second pixel electrode 190b is overlapped with a coupling electrode 176 which is connected to the first pixel electrode 190a. Therefore, the second pixel electrode 190b is electrically coupled with the first pixel electrode 190a. The overlapping areas between the second pixel electrode 190b and the coupling electrode 176 are different among red, green, and blue pixels.

The thin film transistor connected to a gate line 121 transferring scanning signals and a data line 171 transferring image data signals. The thin film transistor switches the image data signals to be applied or to not be applied to the first pixel electrode 190a according to the scanning signals. The second pixel electrode 190b has cutouts 192. A polarizer 12 is attached to the lower surface of the insulating substrate 110. When a reflective LCD is considered, the first and second pixel electrodes 190a and 190b may be made of a non-transparent material. In this case, the polarizer 12 is omitted.

A structure of the color filter panel will now be described. A light blocking layer 220 to prevent light leakage, red, green, and blue color filters 230, and a common electrode 270 made of a transparent conductor such as ITO or IZO are formed on an insulating substrate 210 made of a transparent material such as glass. The common electrode 270 has cutouts 271, 272, and 273. The light blocking layer 220 may be formed on areas overlapping with the cutouts 271, 272, and 273, as well as around pixel areas to prevent light leakage due to the cutouts 271, 272, and 273.

Figure 5:
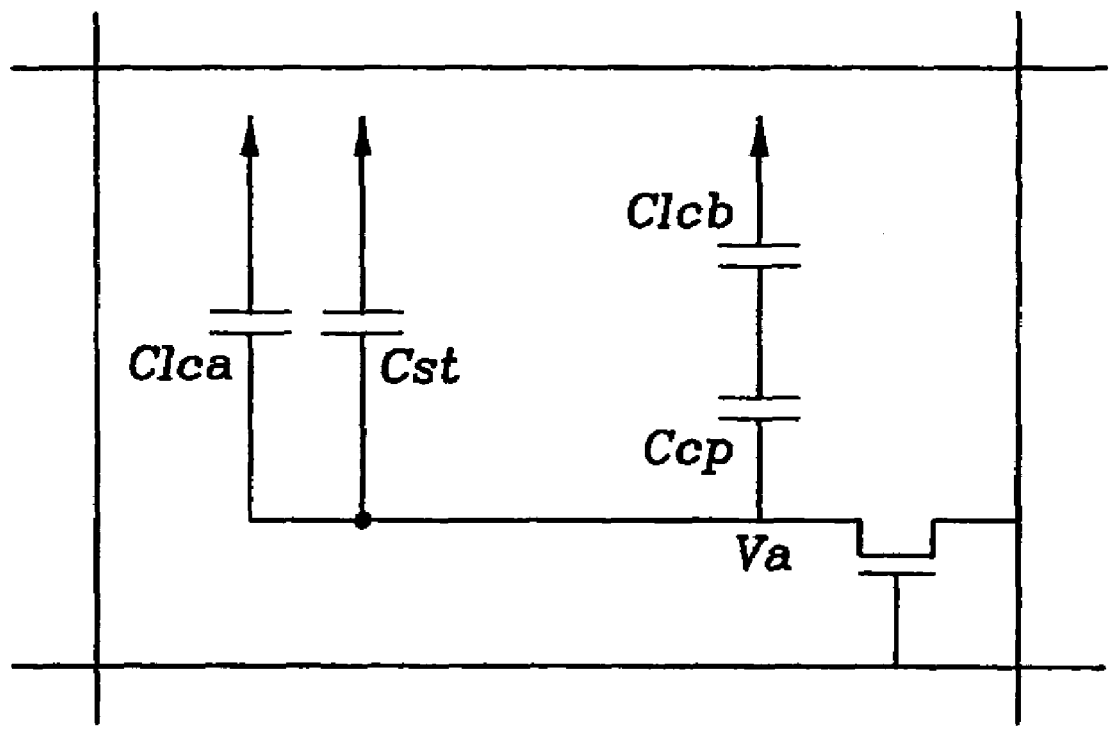
FIG. 5 is a circuit diagram of the LCD shown in FIGS. 1 to 4.

The TFT array panel 100 will now be described in more detail with reference to FIGS. 1, 4, and 5. A plurality of gate lines 121 and a plurality of storage electrode lines 131 are formed on an insulating substrate 110. The gate lines 121 extend substantially in a transverse direction and are separated from each other and transmit gate signals. Each gate line 121 has a plurality of gate electrodes 123 and expansions 125 for connecting to an external circuit.

Each storage electrode line 131 extends substantially in the transverse direction and includes a plurality of sets of storage electrodes 133a, 133b, and 133c. Two storage electrodes 133a and 133b are extended in a longitudinal direction and are connected with a transverse storage electrode 133c. The storage line 131 may include two or more transverse lines.

The gate lines 121 and the storage electrode lines 131 may have a multi-layered structure including two films having different physical characteristics, i.e., a lower film (not shown) and an upper film (not shown). The upper film is preferably made of a low resistivity metal including an Al-containing metal such as Al or an Al alloy for reducing signal delay or voltage drop in the gate lines 121 and the storage electrode lines 131. On the other hand, the lower film is preferably made of a material such as Cr, Mo, or a Mo alloy, which has good contact characteristics with other materials such as indium tin oxide (ITO) and indium zinc oxide (IZO). A good exemplary combination of the lower film material and the upper film material is Cr and an Al—Nd alloy. In addition, the lateral sides of the gate lines 121 and the storage electrode lines 131 are tapered, and the inclination angle of the lateral sides with respect to a surface of the substrate 110 ranges about 30-80 degrees.

A gate insulating layer 140 preferably made of silicon nitride (SiNx) is formed on the gate lines 121 and the storage electrode lines 131. A plurality of semiconductor stripes 151 that are preferably made of hydrogenated amorphous silicon (abbreviated to "a-Si") are formed on the gate insulating layer 140. Each semiconductor stripe 151 extends substantially in the longitudinal direction, and has a plurality of projections 154 branched out toward the gate electrodes 123.

A plurality of ohmic contact stripes 161 preferably made of silicide or n+ hydrogenated a-Si heavily doped with n type impurity are formed on the semiconductor stripes 151 and projections 154. The ohmic contact stripes 161 have substantially the same pattern as the semiconductor stripes 151 except for around the projections 154. Each ohmic contact stripe 161 has a plurality of projections 163, and the projections 163 and the ohmic contact islands 165 are located in pairs on the projections 154 of the semiconductor stripes 151.

A plurality of data lines 171, a plurality of drain electrodes 175, a plurality of coupling electrode 176, and a plurality of under-bridge metal pieces 172 are formed on the ohmic contacts 161, 163, and 165 and the gate insulating layer 140.

Each data line 171 extends substantially in the longitudinal direction and has a plurality of source electrodes 173 extending toward the drain electrodes 175. Each data line 171 includes an expansion 179 having a wider width for contact with another layer or an external device. The under-bridge metal piece 172 is disposed on the gate line 121.

The coupling electrode 176 is connected to the drain electrode 175 and is bent several times to have a "V" shape. The lengths of the coupling electrodes 176 are different from each other among red, green, and blue pixels. The length of the coupling electrode 176 in the green pixel is the longest, the length of the coupling electrode 176 in the red pixel is the second longest, and the length of the coupling electrode 176 in the blue pixel is the shortest.

The data lines 171, the drain electrodes 175, the coupling electrodes 176, and the under-bridge metal piece 172 may have a multi-layered structure including two films having different physical characteristics, i.e., a lower film (not shown) and an upper film (not shown). The upper film is preferably made of a low resistivity metal including an Al-containing metal such as Al or an Al alloy for reducing signal delay or voltage drop in the data lines. On the other hand, the lower film is preferably made of a material such as Cr, Mo, or an Mo alloy, which has good contact characteristics with other materials such as indium tin oxide (ITO) and indium zinc oxide (IZO). A good exemplary combination of the lower film material and the upper film material is Cr and an Al—Nd alloy.

A passivation layer 180 made of an inorganic material such as silicon nitride or an organic material such as resin is formed on the data lines 171, the drain electrodes 175, and the under-bridge metal piece 172. The passivation layer 180 has a plurality of contact holes 181 and 183 respectively exposing a portion of the drain electrode 175 and the expansion 179 of the data line 171. The passivation layer 180 and the gate insulating layer 140 have a plurality of contact holes 182, 184, and 185 respectively exposing the expansion 125 of the gate line 121 and two portions of the storage electrode line 131.

A plurality of pixel electrodes 190a and 190b, a plurality of contact assistants 95 and 97, and a plurality of storage bridges 91 are formed on the passivation layer 180. The pixel electrodes 190a and 190b, the contact assistants 95 and 97, and the storage bridges 91 may be made of a transparent conductor such as ITO and IZO, or a light reflective material such as Al.

The first pixel electrode 190a is connected to the drain electrode 175 through the contact hole 181. The second pixel electrode 190b is electrically floated but is capacitively coupled with the first pixel electrode 190a, since the second pixel electrode 190b is overlapped with the coupling electrode 176. Therefore, the voltage of the second pixel electrode 190b varies dependant on the voltage of the first pixel electrode 190a.

The coupling capacitances formed between the first pixel electrode 190a and the second pixel electrode 190b are different among green, red, and blue pixels. The coupling capacitances formed between the first pixel electrode 190a and the second pixel electrode 190b become smaller step by step in an order of green, red, and blue pixels due to the length shortening of the coupling electrodes 176.

Differentiation of the coupling capacitances of the first pixel electrode 190a and the second pixel electrode 190b among green, red, and blue pixel may be achieved by other methods, such as width and disposition differentiation of the coupling electrode 176, rather than by length differentiation.

When the coupling capacitance of the first sup-pixel electrode 190a and the second pixel electrode 190b in the green pixel is 1, the coupling capacitances of the first sup-pixel electrode 190a and the second pixel electrode 190b in the red pixel preferably range from 0.95 to 1.0 and that of the blue pixel preferably ranges from 0.75 to 0.95.

Cutouts 191, 193, and 194 dividing the first pixel electrode 190a and the second pixel electrode 190b are classified into oblique portions 191 and 193 making an angle of about 45 degrees with the gate line 121, and a longitudinal portion 194 making an angle of about 90 degrees with the gate line 121. The two oblique portions 191 and 193 make an angle of about 90 degrees.

The second pixel electrode 190b has a cutout 192 which initiates from the right side of the second pixel electrode 190b and extends toward the left side. The entrance of the cutout 191 is widened due to the corner cut of the second pixel electrode 190b. The first pixel electrode 190a and the second pixel electrode 190b respectively make a mirror image with respect to a longitudinal center line of a pixel.

The storage bridge 91 crosses over the gate line 121 and connects two storage lines that are disposed on both sides of the gate line 121. The storage bridge 91 contacts the storage electrode 133a and the storage electrode line 131 through the contact holes 183 and 184. The storage bridge 91 overlaps the under-bridge metal piece 172. The storage bridges 91 electrically connect all the storage electrode lines 131 on the insulating substrate 110.

The storage electrode lines 131 may be used to repair defects of the gate lines 121 and the data lines 171. Such repairs are done by illumination of a laser. The under-bridge metal piece 172 helps electrical connection of the gate line 121 and the storage bridge 91.

The contact assistants 95 and 97 are respectively connected to the expansion 125 of the gate line 121 and the expansion 179 of the data line 171 through the contact holes 182 and 183.

The color filter panel 200 will be described with respect to FIGS. 2, 4, and 5. A black matrix 220 for preventing light leakage is formed on an insulating substrate 210 such as transparent glass. A plurality of red, green, and blue color filters 230 are formed on the black matrix and the substrate 210 and extend substantially along the columns of the pixel areas. An overcoat 250 is formed on the color filters 230 and the black matrix 220. A common electrode 270, preferably made of a transparent conductive material such as ITO or IZO, is formed on the overcoat 250. The common electrode 270 has a plurality of cutouts 271, 272, and 273.

A set of cutouts 271, 272, and 273 include oblique portions and end portions. The oblique portions of the cutouts 271, 272, and 273 are parallel with the oblique portions 191 and 193 of the cutout between the pixel electrodes 190a and 190b. The oblique portions 191 and 193 are disposed between the oblique portions of the cutouts 271, 272, and 273. The end portions overlap the boundary line of the pixel area and include longitudinal end portions and transverse end portions.

The LCD includes a TFT array panel 100, a color filter array panel 200 facing the TFT array panel 100 and separated therefrom by a predetermined gap, and a liquid crystal layer 3 filled in the predetermined gap. When the two panels 100 and 200 are assembled, the cutouts 271, 272, and 273 of the common electrode 270 partition the two pixel electrodes 190a and 190b into a plurality of sub-areas. In the present embodiment, as shown in FIG. 3, the two pixels 190a and 190b are respectively partitioned into four sub-areas. As shown in FIG. 3, each sub-area has two parallel long edges and several short edges. Therefore, the sub-areas have length direction and width direction.

Each liquid crystal 3 portion disposed between each of the sub-areas of the pixel electrodes 190a and 190b and corresponding sub-areas of the common electrode 270 is a sub-region. The sub-regions are classified into four species according to the average long axis direction of liquid crystals disposed therein. The sub-regions will be called a domain from now on.

The first pixel electrode 190a is physically and electrically connected to the drain electrodes 175 through the contact holes 181. The second pixel electrode 190b is physically and electrically floated, but is overlapped with the coupling electrode 176 to form coupling capacitances with the first pixel electrodes 190a. Therefore, the voltage of the second pixel electrode 190b depends on the voltage of the first pixel electrode 190a. The voltage of the second pixel electrode 190b with respect to the common voltage is always smaller than that of the first pixel electrode 190a. In the meantime, when a pixel area includes two sub-areas with somewhat different electric fields, lateral visibility is improved by the mutual compensation in the two sub-areas.

The coupling relationship between the first pixel electrode 190a and the second pixel electrode 190b will be described later in detail with reference to FIG. 5. FIG. 5 is a circuit diagram of the LCD shown in FIGS. 1 to 4. In FIG. 5, Clca stands for liquid crystal (LC) capacitance formed between the first pixel electrode 190a and the common electrode 270, and Cst stands for storage capacitance formed between the first pixel electrode 190a and the storage line 131. Clcb stands for liquid crystal (LC) capacitance formed between the second pixel electrode 190b and the common electrode 270, and Ccp stands for coupling capacitance formed between the first pixel electrode 190a and the second pixel electrode 190b.

The voltage Vb of the second pixel electrode 190b with reference to the common voltage and the voltage Va of the first pixel electrode 190a with reference to the common voltage are related by the voltage distribution law as follows:

$$Vb=Va \times [Ccp/(Ccp+Clcb)].$$

Since Ccp/(Ccp+Clcb) is always smaller than 1, Vb is always smaller than Va. The capacitance Ccp can be adjusted by overlapping an area or distance between the second pixel electrode 190b and the coupling electrode 176. The overlapping area between the second pixel electrode 190b and the coupling electrode 176 can be easily adjusted by changing the width of the coupling electrode 176. The distance between the second pixel electrode 190b and the coupling electrode 176 can be easily adjusted by changing the location of the coupling electrode 176. That is, in the present embodiment, the coupling electrode 176 is formed on the same layer as the data line 171, but the coupling electrode 176 may be formed on the same layer as the gate line 121. By this change, the distance between the second pixel electrode 190b and the coupling electrode 176 is increased. In the meantime, voltage differences between the two pixel electrodes 190a and 190b are different among red, green, and blue pixels due to the difference of coupling capacitance. Through this, a bluish tinge is diminished to improve side visibility of an LCD.

Figure 10A:
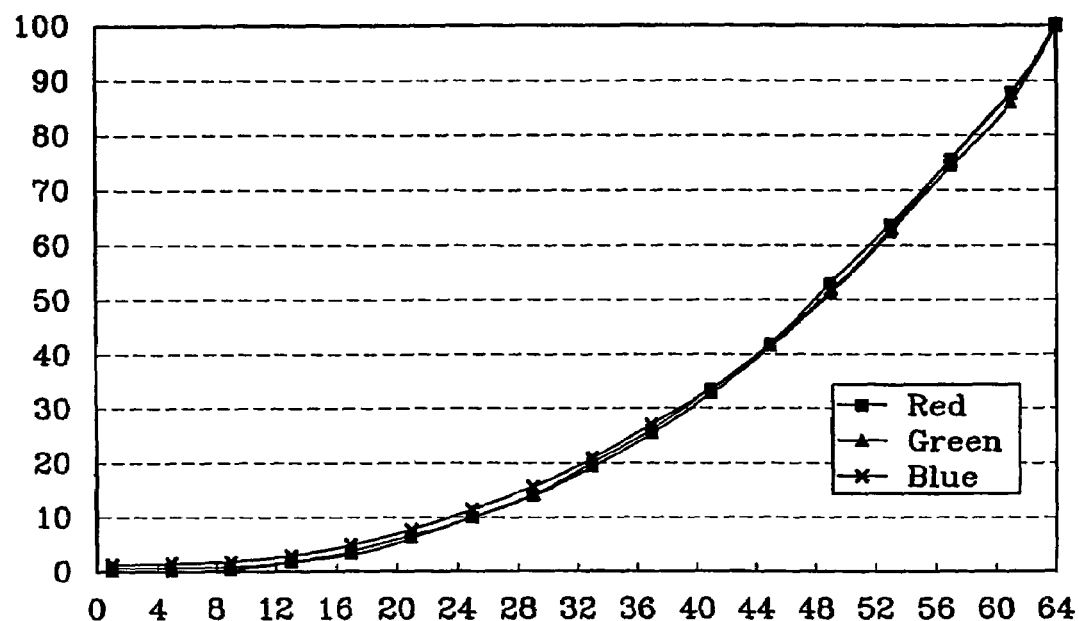
FIG. 10A is a gamma curve front view.

Now, the bluish tinge phenomenon will be described with reference to FIGS. 10A to 10C and the reason why the present invention diminishes the bluish tinge will be described. FIG. 10A shows gamma curves of a front view, FIG. 10B shows gamma curves of an upper side view, and FIG. 10C shows gamma curves of a diagonal side view.

Figure 10B:
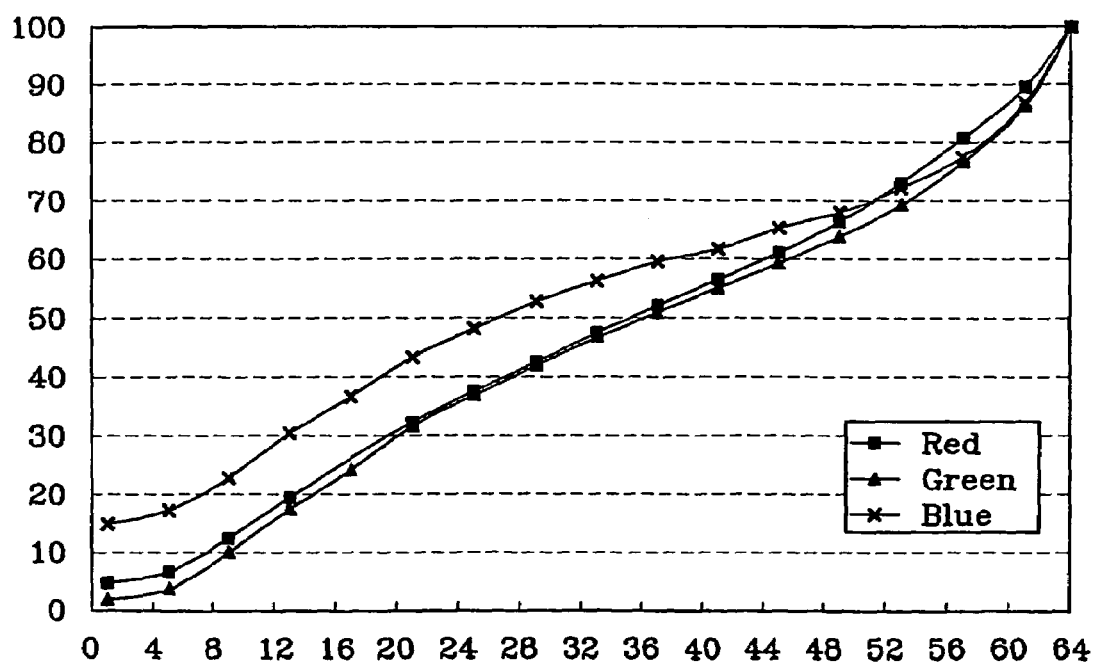
FIG. 10B is a gamma curve upper side view.
Figure 10C:
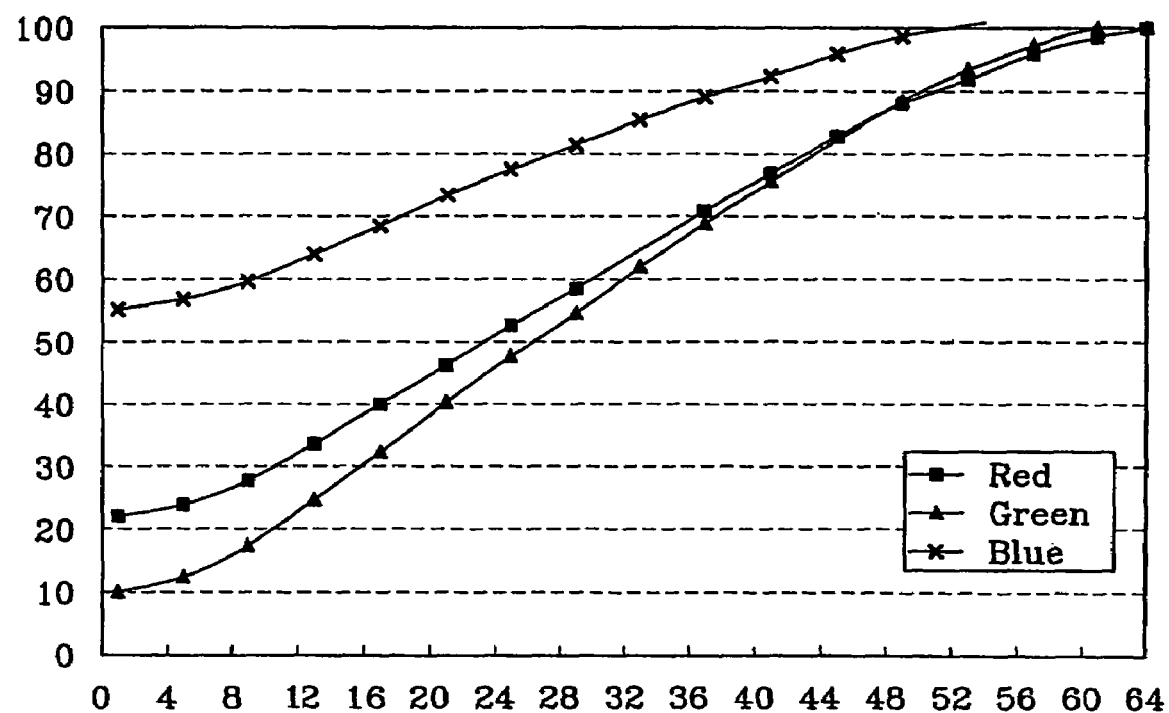
FIG. 10C is a gamma curve diagonal side view.

As shown in FIGS. 10A to 10C, when an LCD is viewed from directly in front, gamma curves of red, green, and blue almost correspond. However, when an LCD is viewed from the upper side or diagonal side, gamma curves of green and blue deviate from that of red as the gray level goes down. In particular, the gamma curve of blue severely deviates. This means that when an LCD is viewed from upper or diagonal sides, a ratio of blue light increases as the gray level goes down. This is the cause of the bluish tinge.

In the present invention, a pixel area includes two pixel electrodes, different voltages are applied to the two pixel electrodes, and a voltage difference between the two pixel electrodes is different among red, green, and blue pixels.

A coupling capacitance between the two pixel electrodes 190a and 190b of the blue pixel is smaller than that of the red and green pixels to alleviate an increase of the blue light ratio in the low gray level. When the coupling capacitance between the two pixel electrodes 190a and 190b is smaller, the voltage of the second pixel electrode 190b induced by electrical coupling with the first pixel electrode 190a is lower. Therefore, voltages applied to the second pixel electrode 190b in the same gray level are arranged in an order of blue<red<green according to their magnitude. Such voltage differences by colors increases as the gray level goes down. Accordingly, the ratio of blue pixel voltage with respect to green pixel voltage becomes smaller as the gray level goes down. The ratio of blue pixel voltage with respect to green pixel voltage also becomes smaller as the gray level goes down. As a result, the bluish tinge is alleviated.

Figure 6:
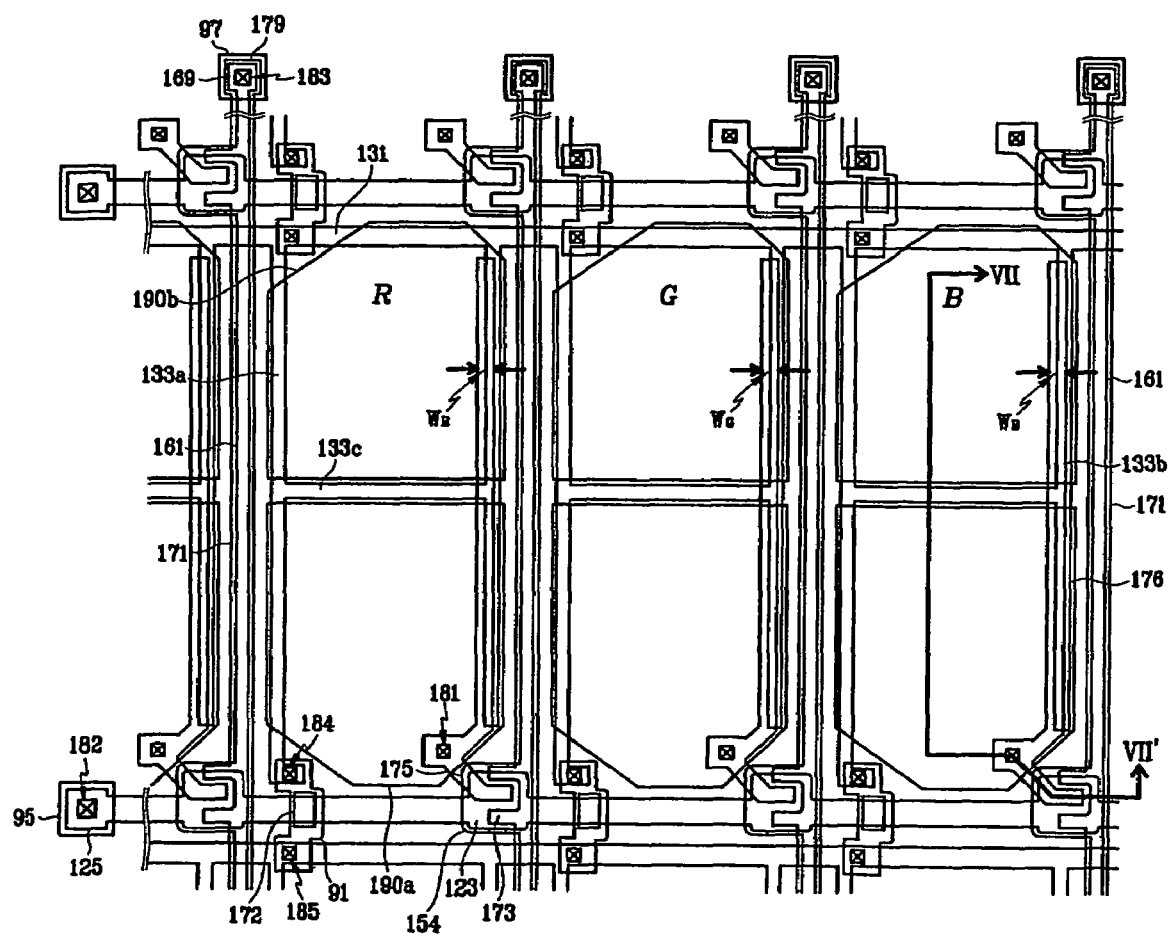
FIG. 6 is a layout view of a thin film transistor array panel for an LCD according to another embodiment of the present invention.
Figure 7:
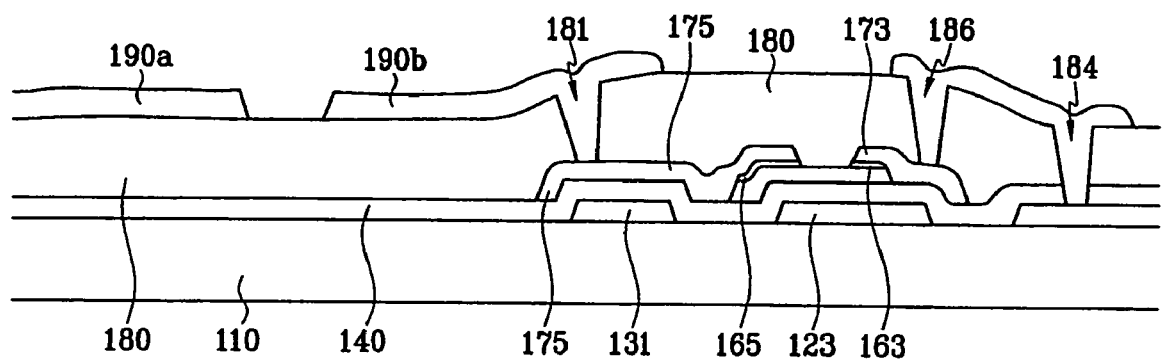
FIG. 7 is a sectional view of the LCD shown in FIG. 6 taken along the line VII-VII'.

The present invention may be applied to a twisted nematic (TN) mode TFT. Such an embodiment will be described. FIG. 6 is a layout view of a thin film transistor array panel for an LCD according to another embodiment of the present invention. FIG. 7 is a sectional view of the LCD shown in FIG. 6 taken along the line VII-VII'.

A plurality of gate lines 121 and a plurality of storage electrode lines 131 are formed on an insulating substrate 110. The gate lines 121 extend substantially in a transverse direction, and are separated from each other and transmit gate signals. The gate line 121 has a plurality of gate electrodes 123 and expansions 125 for connecting to external circuit.

Each storage electrode line 131 extends substantially in the transverse direction, and includes a plurality of sets of storage electrodes 133a, 133b, and 133c. Two storage electrode 133a and 133b are extended in the longitudinal direction and are connected with a transverse storage electrode 133c. The storage line 131 may include two or more transverse lines.

The gate lines 121 and the storage electrode lines 131 may have a multi-layered structure including two films having different physical characteristics, i.e., a lower film (not shown) and an upper film (not shown). The upper film is preferably made of a low resistivity metal including an Al-containing metal such as Al or an Al alloy for reducing signal delay or voltage drop in the gate lines 121 and the storage electrode lines 131. On the other hand, the lower film is preferably made of a material such as Cr, Mo, or an Mo alloy, which has good contact characteristics with other materials such as indium tin oxide (ITO) and indium zinc oxide (IZO). A good exemplary combination of the lower film material and the upper film material is Cr and an Al—Nd alloy.

In addition, the lateral sides of the gate lines 121 and the storage electrode lines 131 are tapered, and the inclination angle of the lateral sides with respect to a surface of the substrate 110 ranges about 30-80 degrees.

A gate insulating layer 140 preferably made of silicon nitride (SiNx) is formed on the gate lines 121 and the storage electrode lines 131. A plurality of semiconductor stripes 151 preferably made of hydrogenated amorphous silicon (abbreviated to "a-Si") is formed on the gate insulating layer 140. Each semiconductor stripe 151 extends substantially in the longitudinal direction, and has a plurality of projections 154 branched out toward the gate electrodes 123.

A plurality of ohmic contact stripes 161 that are preferably made of silicide or n+ hydrogenated a-Si heavily doped with n-type impurities are formed on the semiconductor stripes 151 and projections 154. The ohmic contact stripes 161 have substantially the same pattern with the semiconductor stripes 151, except for around the projections 154. Each ohmic contact stripe 161 has a plurality of projections 163, and the projections 163 and the ohmic contact islands 165 are located in pairs on the projections 154 of the semiconductor stripes 151.

A plurality of data lines 171, a plurality of drain electrodes 175, a plurality of coupling electrodes 176, and a plurality of under-bridge metal pieces 172 are formed on the ohmic contacts 161, 163, and 165 and the gate insulating layer 140. Each data line 171 extends substantially in the longitudinal direction, and has a plurality of source electrodes 173 extending toward the drain electrodes 175. Each data line 171 includes an expansion 179 having a wider width for contact with another layer or an external device.

The under-bridge metal piece 172 is disposed on the gate line 121. The coupling electrode 176 is connected to the drain electrode 175. The widths of the coupling electrodes 176 are different from each other among red, green, and blue pixels. The width of the coupling electrode 176 in the green pixel is the widest, the width of the coupling electrode 176 in the red pixel is the second widest, and the width of the coupling electrode 176 in the blue pixel is the narrowest.

The data lines 171, the drain electrodes 175, the coupling electrodes 176, and the under-bridge metal pieces 172 may have a multi-layered structure including two films having different physical characteristics, i.e., a lower film (not shown) and an upper film (not shown). The upper film is preferably made of a low resistivity metal including an Al-containing metal such as Al or an Al alloy for reducing signal delay or voltage drop in the data lines. On the other hand, the lower film is preferably made of a material such as Cr, Mo, or an Mo alloy, which has good contact characteristics with other materials such as indium tin oxide (ITO) and indium zinc oxide (IZO). A good exemplary combination of the lower film material and the upper film material is Cr and an Al—Nd alloy.

A passivation layer 180 made of an inorganic material such as silicon nitride or an organic material such as resin is formed on the data lines 171, the drain electrodes 175, and the under-bridge metal pieces 172.

The passivation layer 180 has a plurality of contact holes 181 and 183 respectively exposing a portion of the drain electrode 175 and the expansion 179 of the data line 171. The passivation layer 180 and the gate insulating layer 140 have a plurality of contact holes 182, 184, and 185 respectively exposing the expansion 125 of the gate line 121 and two portions of the storage electrode line 131.

A plurality of pixel electrodes 190a and 190b, a plurality of contact assistants 95 and 97, and a plurality of storage bridges 91 are formed on the passivation layer 180. The pixel is electrodes 190a and 190b, the contact assistants 95 and 97, and the storage bridges 91 may be made of a transparent conductor such as ITO or IZO, or a light reflective material such as Al.

The first pixel electrode 190a is connected to the drain electrode 175 through the contact hole 181. The second pixel electrode 190b is electrically floated but is capacitively coupled with the first pixel electrode 190a, since the second pixel electrode 190b is overlapped with the coupling electrode 176. Therefore, the voltage of the second pixel electrode 190b varies depending on the voltage of the first pixel electrode 190a.

The coupling capacitances formed between the first pixel electrode 190a and the second pixel electrode 190b are different among green, red, and blue pixels. The coupling capacitances formed between the first pixel electrode 190a and the second pixel electrode 190b become smaller step by step in an order of green, red, and blue pixels due to the width narrowing of the coupling electrodes 176.

As described with respect to the embodiment of FIGS. 1 to 4, differentiation of the coupling capacitances of the first sup-pixel electrode 190a and the second pixel electrode 190b among green, red, and blue pixels may be achieved by other methods. In the present invention, width differentiation of the coupling electrode 176 is applied.

When the coupling capacitance of the first sup-pixel electrode 190a and the second pixel electrode 190b in the green pixel is 1, the coupling capacitance of the first sup-pixel electrode 190a and the second pixel electrode 190b in the red pixel preferably ranges from 0.95 to 1.0, and that of the blue pixel preferably ranges from 0.75 to 0.95.

The first pixel electrode 190a and the second pixel electrode 190b are respectively disposed in the lower half and the upper half of a pixel area. The storage electrode 133c is disposed between the two pixel electrodes 190a and 190b.

The storage bridge 91 crosses over the gate line 121 and connects two storage lines that are disposed on both sides of the gate line 121. The storage bridge 91 contacts the storage electrode 133a and the storage electrode line 131 through the contact holes 183 and 184. The storage bridge 91 overlaps the under-bridge metal piece 172. The storage bridges 91 electrically connect all the storage electrode lines 131 on the insulating substrate 110.

The storage electrode lines 131 may be used to repair defects of the gate lines 121 and the data lines 171. Such repairs are done by illumination of a laser. The under-bridge metal piece 172 helps electrical connection of the gate line 121 and the storage bridge 91.

The contact assistants 95 and 97 are respectively connected to the expansion 125 of the gate line 121 and the expansion 179 of the data line 171 through the contact holes 182 and 183. When a pixel area includes two sub-areas with somewhat different electric fields, lateral visibility is improved by the mutual compensation in the two sub-areas.

In the meantime, voltage differences between the two pixel electrodes 190a and 190b are different among red, green, and blue pixels due to the differences of coupling capacitance. By this, the bluish tinge is diminished to improve side visibility of an LCD.

Figure 8:
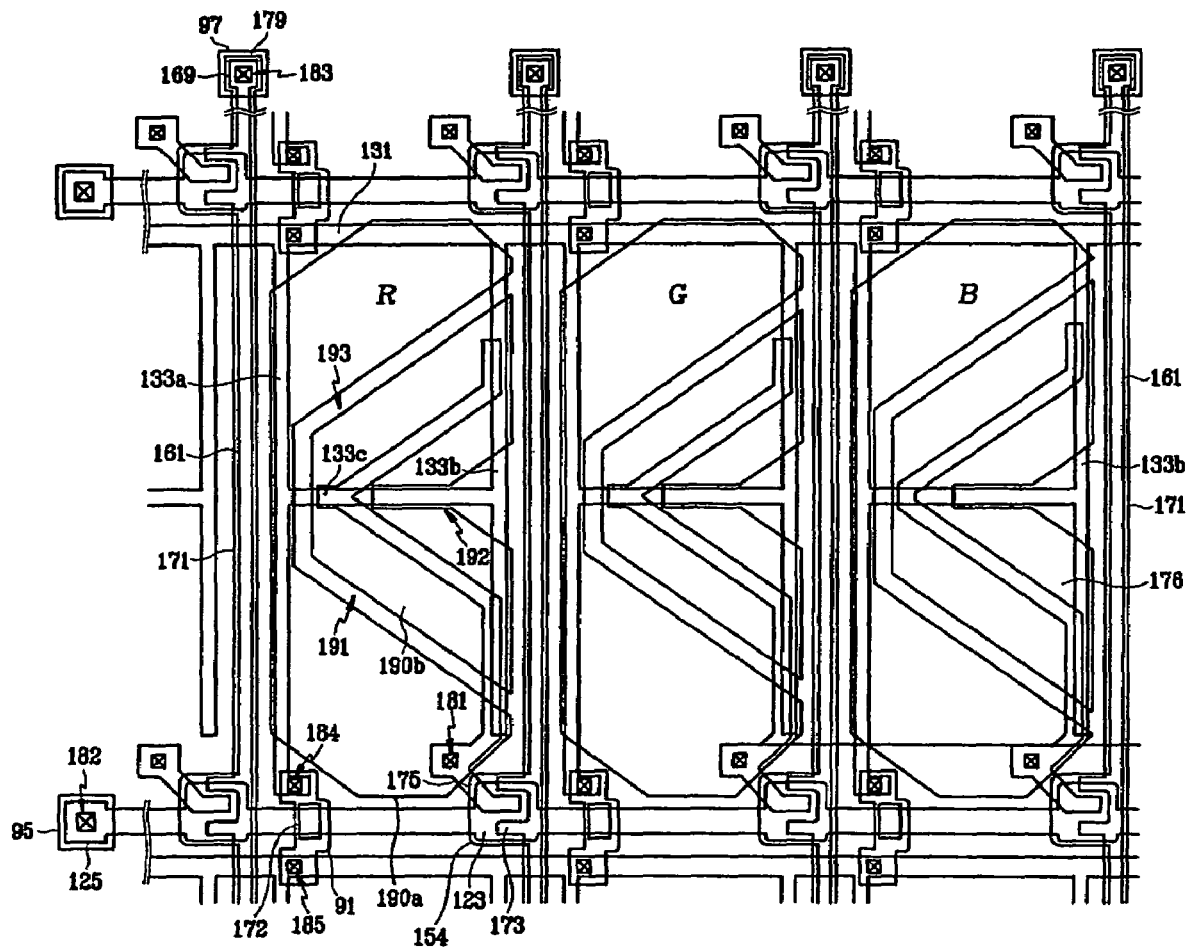
FIG. 8 is a layout view of a thin film transistor array panel for an LCD according to another embodiment of the present invention.

Another embodiment for differentiation of the coupling capacitances of the first pixel electrode 190a and the second pixel electrode 190b among green, red, and blue pixel will now be described. FIG. 8 is a layout view of a thin film transistor array panel for an LCD according to another embodiment of the present invention. In the embodiment of FIG. 8, the area ratio of the second pixel electrode 190b to the first pixel electrode 190a is different among red, green, and blue pixels, but the length of the coupling electrode 176 is the same among red, green, and blue pixels. The other aspects are very similar with the embodiment of FIGS. 1 to 4.

The area ratio of the second pixel electrode 190b to the first pixel electrode 190a as of the green pixel is the smallest. The area ratios of the second pixel electrode 190b to the first pixel electrode 190a increase in an order of the red pixel and the blue pixel. That is, an area taken up by the second pixel electrode 190b in a pixel area increases in an order of green, red, and blue pixels. The area ratios of the second pixel electrode 190b with respect to the first pixel electrode 190a in the green, red, and blue pixels are preferably 6:4, 5.5:4.5, and 5:5. The area ratios of the second pixel electrode 190b to the first pixel electrode 190a may have various values as long as the area ratios become larger in an order of green, red, and blue pixels.

According to the embodiments, though the same gray voltage is applied to red, green, and blue pixels, voltages of the second pixel electrodes 190b are different among red, green, and blue pixels to improve visibility of an LCD.

Figure 9:
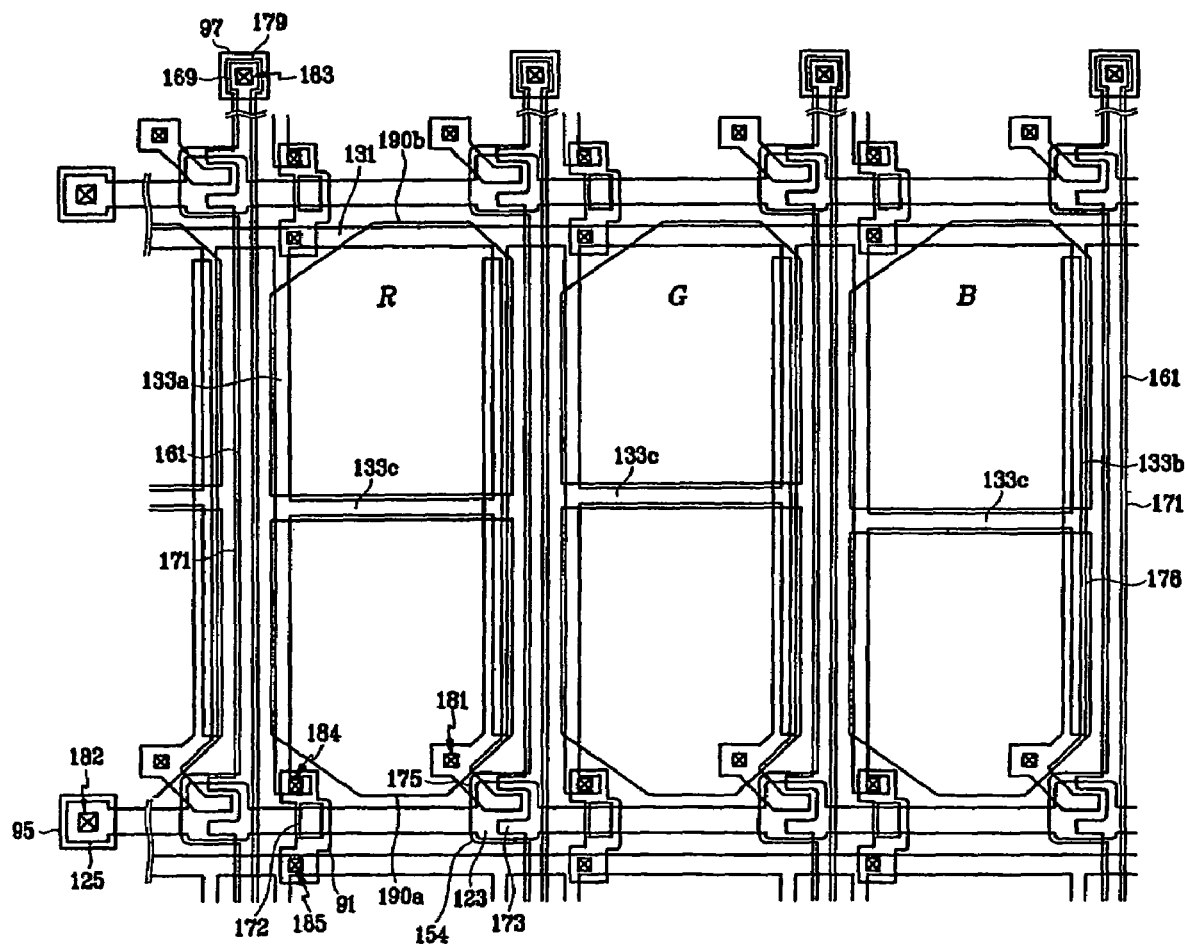
FIG. 9 is a layout view of a thin film transistor array panel for an LCD according to another embodiment of the present invention.

FIG. 9 is a layout view of a thin film transistor array panel for an LCD according to another embodiment of the present invention. In the embodiment of FIG. 9, the area ratio of the second pixel electrode 190b to the first pixel electrode 190a is different among red, green, and blue pixels, but the width of the coupling electrode 176 is the same among the red, green, and blue pixels. The other aspects are very similar with the embodiment of FIGS. 6 and 7.

The area ratio of the second pixel electrode 190b to the first pixel electrode 190a of the green pixel is the smallest. The area ratios of the second pixel electrode 190b to the first pixel electrode 190a increase in an order of the red pixel and the blue pixel. That is, an area taken up by the second pixel electrode 190b in a pixel area increases in an order of green, red, and blue pixels. The area ratios of the second pixel electrode 190b with respect to the first pixel electrode 190a in the green, red, and blue pixels are preferably 6:4, 5.5:4.5, and 5:5. The area ratios of the second pixel electrode 190b to the first pixel electrode 190a may have various values as long as the area ratios become larger in an order of green, red, and blue pixels.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims. In particular, cutouts in the pixel and common electrodes may be rearranged in various ways.

What is claimed is:

1. A thin film transistor array panel comprising:
an insulating substrate;
a plurality of first signal lines formed on the insulating substrate;
a plurality of second signal lines intersecting the first signal lines in an insulated manner;
a plurality of first pixel electrodes each formed in a respective pixel areas;
a plurality of thin film transistors having three electrodes respectively connected to the first signal line, the second signal line, and the first pixel electrode; and
a plurality of second pixel electrodes electrically coupled with the first pixel electrodes, and each second pixel electrode being formed in respective pixel area,
wherein the pixels include red, green, and blue pixels, and coupling capacitances between the first pixel electrode and the second pixel electrode are different in at least two pixels that are chosen among the red, green, and blue pixels.

2. The thin film transistor array panel of claim 1, further comprising a plurality of coupling electrodes connected to the first pixel electrode and overlapped with the second pixel electrodes in an insulated manner.

3. The thin film transistor array panel of claim 2, wherein at least one of the first and second pixel electrodes has a domain dividing member.

4. The thin film transistor array panel of claim 2, wherein the coupling electrodes are connected to and elongated from drain electrodes of the thin film transistors.

5. A thin film transistor array panel comprising:
an insulating substrate;
a plurality of first signal lines formed on the insulating substrate;
a plurality of second signal lines intersecting the first signal lines in an insulated manner;
a plurality of first pixel electrodes each formed in a respective pixel area;
a plurality of thin film transistors having three electrodes respectively connected to the first signal line, the second signal line, and the first pixel electrode;
a plurality of second pixel electrodes capacitively coupled with the first pixel electrodes, and each second pixel electrode being formed in a respective pixel area,
wherein the pixels include red, green, and blue pixels, and area ratios electrode with respect to the first pixel electrode are different in at least two pixels that are chosen among the red, green, and blue pixels.

6. The thin film transistor array panel of claim 5, further comprising a plurality of coupling electrodes connected to the first pixel electrodes and overlapped with the second pixel electrodes in an insulated manner.

7. The thin film transistor array panel of claim 6, wherein the coupling electrodes are connected to and elongated from drain electrodes of the thin film transistors.

8. A thin film transistor array panel of claim 5,
wherein at least one of the first and second pixel electrodes has a domain dividing member.

9. A thin film transistor array panel comprising:
an insulating substrate;
a plurality of first signal lines formed on the insulating substrate;

a plurality of second signal lines intersecting the first signal lines in an insulated manner;

a plurality of first pixel electrodes each formed in respective pixel areas;

a plurality of thin film transistors having three electrodes respectively connected to the first signal line, the second signal line, and the first pixel electrode;

a plurality of second pixel electrodes electrically coupled with the first pixel electrodes, and each second pixel electrode being formed in respective pixel area, wherein coupling capacitances between the first pixel electrode and the electrode are different in two pixels that correspond to different colors.

10. The thin film transistor array panel of claim 9, further comprising a plurality of coupling electrodes connected to the first pixel electrode and overlapped with the second pixel electrodes in an insulated manner.

11. The thin film transistor array panel of claim 10, wherein at least one of the first and second pixel electrodes has a domain dividing member.

12. The thin film transistor array panel of claim 10, wherein the coupling electrodes are connected to and elongated from drain electrodes of the thin film transistors.

13. The thin film transistor array panel of claim 10, wherein the pixels include red, green, and blue pixels and the lengths of the coupling electrodes decrease in an order of green, red, and blue pixels.

14. The thin film transistor array panel of claim 10, wherein the pixels include red, green, and blue pixels and the widths of the coupling electrodes decrease in an order of green, red, and blue pixels.

15. The thin film transistor array panel of claim 9, wherein the pixels include red, green, and blue pixels and when the coupling capacitance between the first pixel electrode and the second pixel electrode in the green pixel is 1, the coupling capacitance of the first pixel electrode and the second pixel electrode in the red pixel ranges from 0.95 to 1.0, and that of the blue pixel ranges from 0.75 to 0.95.

* * * * *